Nov. 16, 1954 Y. PONSAR 2,694,411
SELF-CENTERING VALVE WITH SPRING OF SLIGHT LATERAL STABILITY
Filed March 23, 1951 2 Sheets-Sheet 1

INVENTOR.
YVES Ponsar
BY
George M. Cooley
ATTORNEY

Nov. 16, 1954 Y. PONSAR 2,694,411
SELF-CENTERING VALVE WITH SPRING OF SLIGHT LATERAL STABILITY
Filed March 23, 1951 2 Sheets-Sheet 2
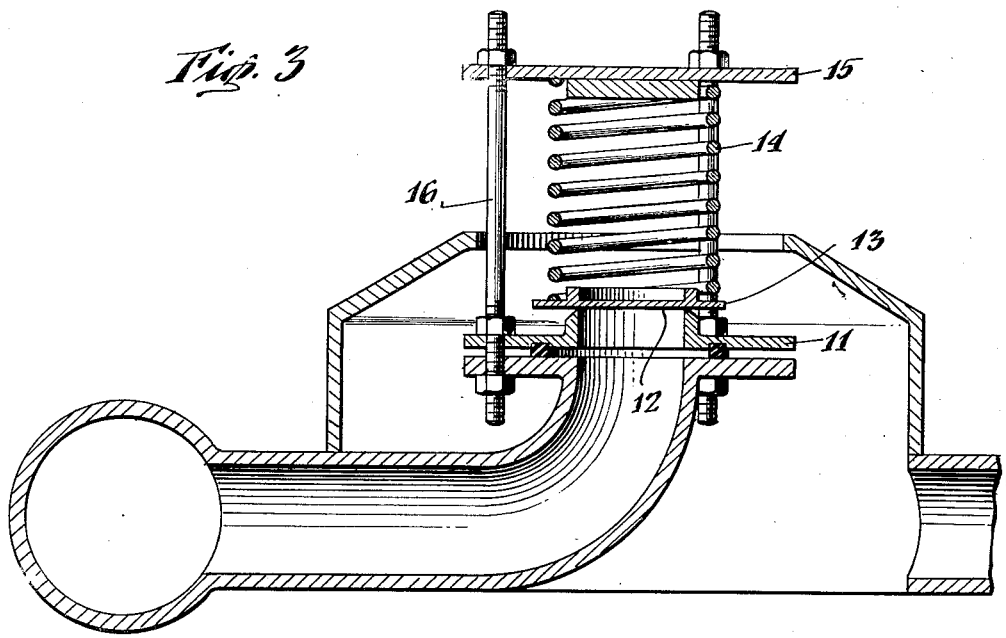
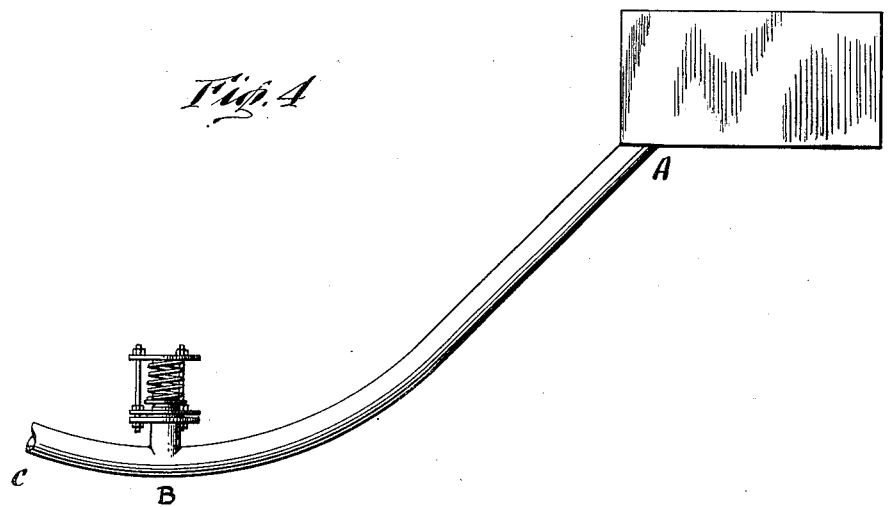
INVENTOR.
Yves Ponsar
BY
ATTORNEY

United States Patent Office 2,694,411
Patented Nov. 16, 1954

2,694,411

SELF-CENTERING VALVE WITH SPRING OF SLIGHT LATERAL STABILITY

Yves Ponsar, Bois-Colombes, France, assignor to Etablissements Neyrpic, Grenoble, France, a corporation of France Application March 23, 1951, Serial No. 217,155

Claims priority, application France July 1, 1950

4 Claims. (Cl. 137—543.17)

The present invention relates to fluid pressure control apparatus, and particularly to pressure regulating valves of the type including an obturator plate cooperating with the outlet end of a nozzle from which a jet of fluid issues.

It is well known that when an obturator plate of suitable form and dimensions is placed before a nozzle and subjected to the action of a jet issuing from the nozzle, the plate has the property of centering itself in the jet. That is to say, that if an accidental lateral displacement causes the plate to move out of alignment with the axis of the liquid jet, the resulting forces will return the plate automatically to its initial position. See, for example, my copending application Serial No. 751,667, filed June 2, 1947, now Patent No. 2,646,060 of July 21, 1953, entitled Apparatus for Automatically Regulating the Flow of Fluids, and my copending application Serial No. 178,818, filed August 11, 1950, now abandoned, entitled Self Centering Valve.

Many applications of that self-centering property are known. In particular, certain float gages have been constructed wherein the obturator has the form of a plate and does not require any guiding structure. However, such apparatus includes joints which must be constructed with great care in order to avoid any possibility of friction or objectionable wedging action.

An object of the present invention is to provide an improved pressure regulating apparatus of the type in which the principal element is a self-centering plate located in front of an orifice or nozzle.

In an apparatus embodying the present invention, the plate is maintained in position by the action of a compression spring which biases the plate toward the orifice or nozzle. One end of the spring engages the obturator plate, to which it may if desired, be fixed by welding or any other appropriate means. The opposite end of the spring is retained by a fixed abutment whose position may be adjusted. Neither the spring nor the obturator plate is guided by any means whatsoever. The position of equilibrium of the plate is determined by the characteristics of the spring and by the hydraulic forces acting on the plate. Since the hydraulic forces tend to center the plate when unseated, the latter operates in a stable manner, even though an axial force of the same magnitude as that due to the pressure of the water, acting by itself, would stress the spring beyond its limit of lateral elastic stability.

For reasons of safety, it is best in most cases to use a spring which is just laterally stable when subject to a force equal to the hydraulic force or which has a slight margin of lateral stability, without taking into account the self-centering effect.

In spite of the fact that the spring may be operated near its limit of elastic lateral stability, it is not necessary to provide for guiding of the spring, because the self-centering action of the obturator will contribute to the improvement of the stability of the spring.

From the foregoing, it may be seen that the invention permits the elimination of all guides and joints, so that all friction and wedging action are avoided.

The plate and spring are therefore the only moving parts of the apparatus. The weight of those parts may be reduced to a minimum, since the spring is precisely calculated so that it is near its limit of lateral stability when subjected to the maximum force which it will have to furnish in order to balance the pressure which acts continuously against the plate and which is transmitted to the spring by the plate.

Other objects and advantages of the invention will become apparent from a consideration of the following more detailed description, the appended claims and the accompanying drawings, in which several embodiments of the invention are illustrated by way of example.

In the drawings:

Fig. 3 is a sectional view illustrating the application of an embodiment of the invention as a relief valve.

Fig. 4 is a schematic view illustrating an installation wherein apparatus according to the invention is utilized to provide a constant loss of pressure.

Figure 1:
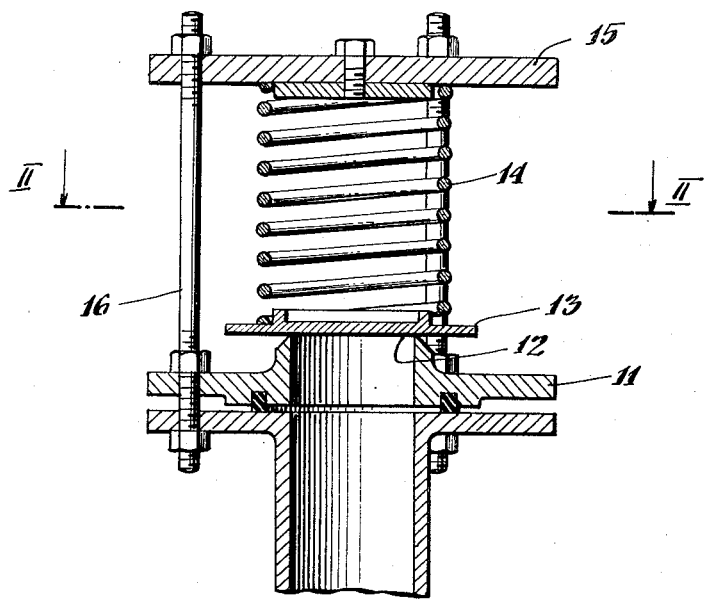
Fig. 1 is a view, partly in elevation and partly in section, of one embodiment of the invention.
Figure 2:
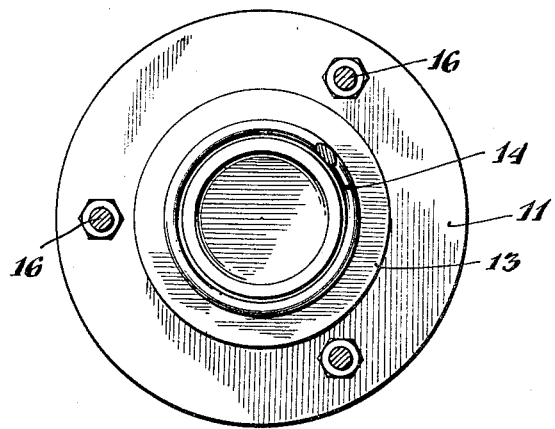
Fig. 2 is a sectional view taken on the line II—II of Fig. 1, looking in the direction of the arrows.

In Fig. 1 there is shown a bronze nozzle 11, which serves as a seat for the valve. It is intended for attachment to a conduit (not shown in the drawing) in which pressure surges occur. It is maintained solidily in place on the conduit by a system of bolts of any suitable design. The nozzle 11 has an opening 12 which is closed by an obturator plate 13 of rust resistant metal. A spring 14 having a high initial compression acts to hold the plate 13 in place and to bias it toward the closed position shown in the drawing. A spring retaining plate 15 is mounted on the nozzle by means of threaded rods 16. This plate retains the upper end of the spring and insures that its compression has the desired value. The retaining plate 15 is adjustable within a range sufficiently wide to balance as carefully as is necessary the strength of the spring to the hydraulic force opposing it.

Whenever a pressure surge, e. g., due to water hammer occurs under the valve, it is lifted by the flow of the liquid being discharged and literally floats on the jet. The self-centering action is provided by properly contouring the valve, and contributes to its stability. The principal requirements of the valve contour are that it be symmetrical with respect to the jet and wider than the jet.

When the valve is a flat plate and its lateral motion is a swinging movement about a center located on the opposite side of the valve from the nozzle, as in the case of the valves illustrated in the drawings, then the principal centering or guiding force is a couple comprising the thrust of the jet against the valve and the reaction force of the spring. When the valve is in its central position, these two forces are equal and opposite so that there is no tendency for the valve to tip or swing. When the valve moves laterally from its central position, the line of action of the reactive spring force moves with the valve, while the line of action of the jet thrust remains at the nozzle axis. The direction of the jet thrust changes, remaining perpendicular to the valve face. The opposed forces are then parallel and have their lines of action spaced apart, so that they constitute a couple tending to rotate the valve back toward its normal position.

The principal advantages of the invention may therefore be set forth as follows:

(1) There are a minimum number of moving parts. These are reduced to two, namely, the self-centering plate and the spring.

(2) There are no mechanical guides, so that the possibility of friction or wedging due to deposits, oxidation or electrolytic attacks is eliminated. The upper end of the spring abuts against the retaining plate 15 and its lower extremity abuts against the self-centering obturator plate 13.

(3) The movable parts have a minimum inertia. This result is obtained both by the reduction of the movable parts to two, and by the fact that the spring is operated near its limit of lateral elastic stability, so that the lightest possible spring may be used.

Two other factors which establish the characteristics of the spring are the desirability of having the decrement as low as possible and the desirability of having a maximum value for the balancing force.

The decrement of the spring may be defined as the ratio of the increment $\Delta F$ of the force of the spring corresponding to the travel of the plate, to the force $F$ which is effective to balance the static pressure. It is also the ratio of the travel $c$ of the plate to the initial deflection of the spring from its free length ($n$ being the number of turns, and $f$ the deflection per turn).

$$\sigma = \frac{\Delta F}{F} = \frac{c}{nf}$$

It is advantageous to make the decrement small, so as to reduce the increment of pressure required for the valve to open fully. In order to obtain such a small decrement, it is necessary to consider the characteristics of the installation and the nature of the factors which may create water hammer, and to determine from those characteristics and factors the optimum diameter for the nozzle and the maximum travel of the obturator plate. From these considerations and others relative to the limit of elastic stabiliy of the spring are determined the characteristics of the spring to be employed.

A coil spring stressed in compression and having its intermediate coils free to move laterally is said to have elastic stability as long as its intermediate coils remain aligned with its end coils. A relatively heavy spring, especially one which is relatively short and has a large diameter, has sufficient lateral elastic stability so that it may be compressed until it "goes solid," i. e., each coil abuts against its neighboring coils. Lighter springs, especially those which are relatively long and of small diameter, cannot be compressed to a length smaller than a certain distance without losing their lateral elastic stability. If such a spring is compressed to a length smaller than that distance, which distance is termed the limit of lateral elastic stability, then any slight vibration, or misalignment force acting laterally near the center of the spring will cause it to bulge laterally and assume a generally U-shaped contour, which it will retain until its ends are released sufficiently to allow its intermediate coils to move back into alignment with the end coils.

It should be noted that closure of the valve always takes place without sudden stops, which might cause water hammer to be initiated at the valve in spite of the fact that the object of the structure is to absorb those water hammer effects which are propagated along the conduit on which the device is mounted.

Closure of the valve is produced when the pressure within the conduit falls to a valve slightly lower than the pressure which causes opening of the valve.

The absence of any danger of cavitation, as mentioned above, makes the apparatus suitable for use as a relief valve in turbine installations (Fig. 3). The conversion of the jet issuing from the apparatus into a flat substantially circular nappe, constitutes an excellent means of dissipating energy in the water. The water which is discharged from the conduit may be easily collected by means of a guiding hood into a basin which may be drained by any suitable means.

In other cases, apparatus according to the invention, employing a self-centering plate and a spring, may be utilized as a valve in a conduit under pressure in order to produce a fall of pressure which will be maintained substantially constant, regardless of the flow passing through the conduit. The spring having a small decrement provides a force which is practically constant between the two positions of maximum opening and closure. For that reason, the apparatus is capable of maintaining a constant fall of pressure.

Referring now to Fig. 4, there is shown a conduit under pressure AC from which it is desired to take off a supply of water through an orifice intermediate the length of the conduit.

It is desirable to provide the orifice B with a gate which will establish a discharge pressure H which remains constant and independent of the flow through the conduit. In order to obtain that result, there may be provided at the orifice B an apparatus comprising a self-centering plate and a spring of the type described above, having a spring whose characteristics are suitably calculated. It should be noted that this apparatus will also function as in the case described above, as an anti-water hammer valve for all surge pressures which may be propagated within the conduit.

It should be understood that the present invention is not limited to the particular embodiments described. On the contrary, it includes all equivalent variations covered by the appended claims, in particular those where the self-centering plate is maintained in place by more than one spring. In particular, although I have illustrated the obturator plate as being flat, other forms of obturators will give a self-centering action. See, for example, the forms described in my copending applications Serial Nos. 751,667 and 178,818, previously mentioned.

I claim:

1. Fluid pressure regulating apparatus comprising a nozzle, a self-centering obturator for opening and closing said nozzle and being freely movable laterally when said nozzle is open, a spring retainer spaced from and in alignment with said nozzle, and a coil spring having a limit of lateral stability under compression, said spring being retained in compression between said obturator and said retainer at a length only slightly greater than the length corresponding to the limit of lateral stability, whereby said fluid will flow freely radially outwardly of said nozzle in all directions when said obturator is spaced from said nozzle.

2. Apparatus for relieving pressure surges in a conduit closed for a predetermined pressure comprising a vertically directed nozzle of circular cross-section receiving fluid from said conduit, a self-centering, flat, circular obturator having a diameter greater than said nozzle for opening and closing said nozzle, a spring retainer spaced from said obturator and said nozzle and in substantially vertical alignment therewith, and a coil spring having a limit of lateral stability under compression, said spring being retained in compression between and attached to said obturator and said retainer at a length only slightly greater than the length corresponding to said limit of lateral stability, said obturator being pivotally attached through said spring to said retainer for positioning in centered alignment with said nozzle, said spring biasing said obturator to closed position in opposition to said predetermined pressure, said obturator being movable in response to pressure surges in excess of said predetermined pressure to a position in spaced relation to said nozzle, and said obturator and said spring being spaced from all horizontally adjacent structures so that they are freely movable laterally during pressure surges, whereby said fluid will flow freely radially outwardly of said nozzle and parallel to said obturator face until the surge is relieved and said obturator is maintained centered relative to said nozzle.

3. Apparatus for relieving pressure surges in a conduit closed for a predetermined pressure comprising a vertically directed nozzle of circular cross-section opening into a space and receiving fluid from said conduit, a self-centering, flat, circular obturator having a diameter greater than said nozzle for opening and closing said nozzle, a spring retainer spaced from said obturator and said nozzle and in substantially vertical alignment therewith, and a coil spring having a limit of lateral stability under compression, said spring being retained in compression between and attached to said obturator and said retainer at a length only slightly greater than the length corresponding to said limit of lateral stability, said obturator being pivotally attached through said spring to said retainer for positioning in centered alignment with said nozzle, said spring biasing said obturator to closed position in opposition to said predetermined pressure, said obturator being movable in response to pressure surges in excess of said predetermined pressure to a position in spaced relation to said nozzle, said obturator and said spring being spaced from all horizontally adjacent structures so that they are freely movable laterally during pressure surges, and said space having dimensions sufficiently great so that flow of fluid from said nozzle is substantially undisturbed, whereby said fluid will flow freely radially outwardly of said nozzle and parallel to said obturator face until said surge is relieved and said obturator is maintained centered relative to said nozzle.

4. Apparatus for relieving pressure surges in a conduit closed for a predetermined pressure comprising a vertically directed nozzle of circular cross-section opening into a space and receiving fluid from said conduit, a self-centering, flat, circular obturator having a diameter greater than said nozzle for opening and closing said nozzle, a spring retainer spaced from said obturator and said nozzle and in substantially vertical alignment therewith, a coil spring having a limit of lateral stability under compression, said spring being retained in compression between and attached to said obturator and said retainer, and a framework connecting said nozzle and said retainer and supporting said retainer at a distance from said nozzle only slightly greater than the distance corresponding to said limit of lateral stability, said obturator being pivotally attached through said spring to said retainer for positioning in centered alignment with said nozzle, said spring biasing said obturator to closed position in opposition to said predetermined pressure, said obturator being movable in response to pressure surges in excess of said predetermined pressure to a position in spaced relation to said nozzle, said obturator and said spring being spaced from all horizontally adjacent structures so that they are freely movable laterally during pressure surges, and said space having dimensions sufficiently great so that the flow of fluid discharge from said opening is substantially undisturbed, whereby said fluid will flow freely radially outwardly of said nozzle and parallel to said obturator face until said surge is relieved and said obturator is maintained centered relative to said nozzle.

References Cited in the file of this patent

UNITED STATES PATENTS

| Number | Name | Date |
|---|---|---|
| 797,739 | Meer | Aug. 22, 1905 |
| 868,022 | Shafer | Oct. 15, 1907 |
| 1,055,437 | Aldridge | Mar. 11, 1913 |
| 2,254,209 | Buttner | Sept. 2, 1941 |
| 2,349,155 | Finley et al. | May 16, 1944 |
| 2,470,372 | Roth | May 17, 1949 |

FOREIGN PATENTS

| Number | Country | Date |
|---|---|---|
| 312,946 | Germany | June 21, 1919 |
| 673,045 | Germany | Mar. 15, 1939 |
| 87,254 | Switzerland | Nov. 16, 1920 |
| 780,707 | France | Feb. 4, 1935 |